April 10, 1945.    L. A. HAWTHORNE    2,373,183
DISTRIBUTOR FOR GRANULAR MATERIALS
Filed June 3, 1942
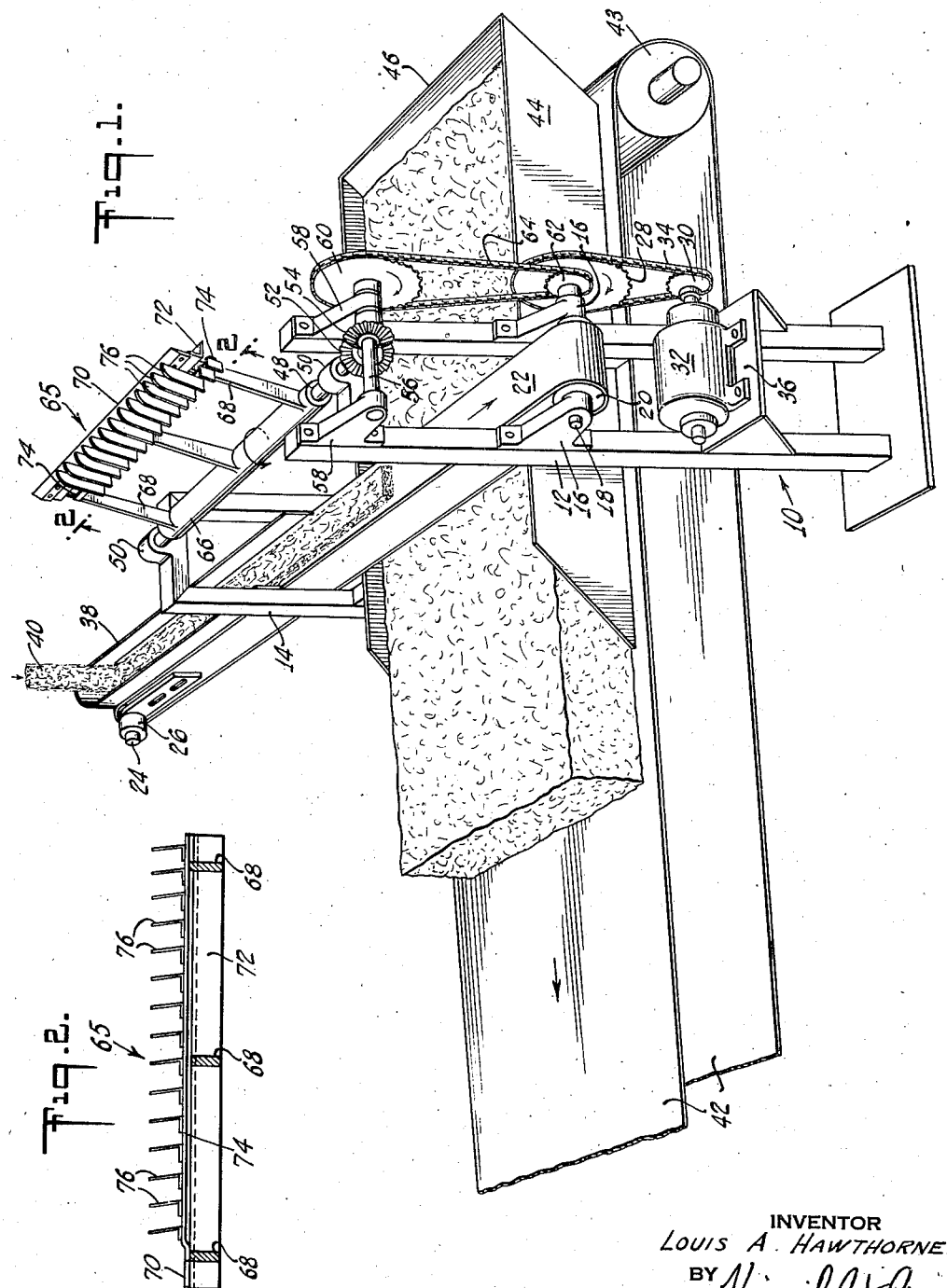
INVENTOR
LOUIS A. HAWTHORNE.
BY
ATTORNEY Patented Apr. 10, 1945

2,373,183

UNITED STATES PATENT OFFICE 2,373,183

DISTRIBUTOR FOR GRANULAR MATERIALS

Louis A. Hawthorne, Hillside, N. J., assignor to Johns-Manville Corporation, New York, N. Y., a corporation of New York Application June 3, 1942, Serial No. 445,591

6 Claims. (Cl. 198—25)

The instant invention relates to an apparatus for distributing material, and has for its principal object the provision of a device or method of this type adapted to provide a uniform distribution to a desired thickness and density of a granular or other loose material.

Although the invention is of general utility, it has particular applicability in connection with the manufacture of mineral wool blocks or sheets from nodulated or granulated mineral wool or the like. Such process involves the building up of a relatively thick layer of the granules to a uniform and predetermined thickness or density. Accordingly, another object of the invention is the provision of an apparatus which will secure the desired distribution of material of this type.

A further object of the invention is the provision of an apparatus and method in which material is continuously supplied in timed relationship to the travel of a conveyor or other carrier and is deposited on such carrier in a substantially uniform layer.

My invention will be more fully understood and further objects and advantages thereof will become apparent when reference is made to the more detailed description thereof which is to follow and to the accompanying drawing, in which:

Fig. 1 is a perspective view of an apparatus embodying the invention; and

Fig. 2 is a sectional view taken on the line 2—2 of Fig. 1.

As previously stated, the invention finds a particular field of use in connection with the manufacture of mineral wool products formed of nodulated or granulated wool or the like, and the specific apparatus described is particularly for this purpose. However, it will be understood that the apparatus and method are generally applicable for providing a relatively uniform layer of any suitable type of granular or loose material, and therefore, the invention is not to be considered as limited to any particular use.

Referring now to the drawing, there is shown a supporting frame 10, comprising end members 12 and 14 carried by the floor or other suitable foundation. End frame 12 includes brackets 16 supporting a shaft 18 and a pulley 20 keyed thereto. The latter supports one end of a conveyor belt 22. The other end of the conveyor belt is supported by a second pulley (not seen), mounted on a shaft 24 carried preferably for free rotation by bearings 26, which are, in turn, supported by any suitable means (not shown) to maintain the belt in substantially horizontal position. Secured to shaft 18 is a sprocket 28 in driven connection with a drive sprocket 30 on a motor 32 through chain 34. Motor 32 is suitably supported by end frame 12 through the medium of shelf 36.

Extending from end frame 14 to the remote end of conveyor 22 is a plate or wall member 38 forming fixed end and side walls for the portion of the conveyor projecting beyond the end frame 14, and providing, in effect, a hopper for the reception of granules or other loose material 40 discharged onto the conveyor, and preventing spillage therefrom during the travel of the material to the spreading device later to be described. Member 38 is supported by frame 14 and any auxiliary supporting means desired (not shown), with its lower edges substantially in contact with the surface of the conveyor.

Located beneath conveyor 22 between end frames 12 and 14, and extending preferably at substantially right angles to conveyor 22, is a second conveyor 42. Conveyor 42 is arranged to carry a layer of the granular material to any suitable processing means (not shown) and is carried by pulleys, one being illustrated at 43, suitably driven to move the conveyor in the direction indicated by the arrow. Supported above conveyor 42, as from end frames 12 and 14, is a forming box or hopper comprising side plates 44 and end plate 46. The forming box overlies the conveyor and extends to, or substantially to, the surface thereof.

Above both conveyors and in substantial alignment with conveyor 22 is a shaft 48 rotatably supported in bearings 50 carried by end frames 12 and 14. Shaft 48 carries a bevel gear 52 in mesh with a similar bevel gear 54 keyed to a cross shaft 56 carried by bearings in brackets 58. A sprocket wheel 60 is keyed to one end of shaft 56 and is connected in driven relationship to a sprocket wheel 62 keyed to shaft 18 by a chain 64 whereby shaft 48 is also driven from the motor 32.

Mounted on shaft 48 is a distributing device 65 comprising, in its preferred embodiment, a sleeve 66 keyed or otherwise secured to shaft 48 to rotate therewith, arms 68 projecting from the sleeve, and a wiper blade 70. The wiper blade preferably comprises a relatively flexible material, such as leather belting, a heavy felt, or the like, and may be supported, as illustrated, by attachment to an angle bar 72 carried by the arms 68. The length of arms 68 and the mounting of shaft 48 are arranged so that the blade 70 contacts the surface of belt 22 for substantially its entire width during each revolution of shaft 48.

Mounted on distributor 65 are a plurality of forwardly projecting baffle or deflector plates 76, preferably at an angle to the blade 70, somewhat less than a right angle, as illustrated in Fig. 2. Any suitable number of the deflectors may be employed, but, as illustrated, one is preferably located at the end of the wiping device adjacent frame 12 and one at a point somewhat removed from the opposite end and a plurality are mounted at suitably close intervals therebetween. Deflectors 76 may comprise thin sheet metal, or the like, and are suitably carried by a bar 74 mounted on arms 68.

In the operation of the apparatus described above, and in the carrying out of the method of the instant invention, a granular material, such as nodulated mineral wool, is deposited from any suitable supply device (not shown) on conveyor 22, as illustrated at 40, to form a layer thereon, and is carried thereby over conveyor 42. The quantity of material deposited and the relative speeds of the two conveyors are adjusted to obtain a layer of the material on conveyor 42 of the thickness or density desired. Conveyor 22 is relatively narrow, as illustrated, to permit distributor 65 to exert a wiping action completely across the same, and consequently, must travel at a high rate as compared to the relatively slowly moving conveyor 42.

Sprockets 28, 60, and 62 are of selected diameters so that as the distributor makes one complete revolution, a length of conveyor 22 is advanced equal to, or substantially equal to, the length of the wiping blade 70. During each revolution of the distributor, blade 70 contacts the material carried by conveyor 22 and sweeps it therefrom onto the portion of conveyor 42 bounded by plates 44 and 46. The wiping or sweeping action of the distributor scatters the material over the area of conveyor 42 defined by the plates, and, as the operation is repeated, the material builds up to a substantially uniform, continuous thickness on the conveyor.

Due to the relatively rapid travel of conveyer 22, the material will have a tendency, when swept from the belt, to move at an angle to the direction of travel of conveyor 42. To overcome this difficulty, the deflectors 76 are provided, which serve as a re-directing means for the granules, confining them in the desired paths. In lieu of the use of the deflectors or baffle plates, the angle between the conveyers 22 and 42 may be adjusted, depending upon the speed of movement of conveyer 22, to take into account the angular direction of movement of the granules. The deflector plates, however, provide the preferred means of overcoming this problem.

Having thus described my invention in rather full detail, it will be understood that these details need not be strictly adhered to, but that various changes and modifications will suggest themselves to one skilled in the art, all falling within the scope of the invention as defined by the subjoined claims.

What I claim is:

1. A material distributing apparatus comprising a linear conveyor for a mass of loose fibrous material, a second, relatively wider conveyor extending at an angle to said first-mentioned conveyor and including an unobstructed area to receive material swept from said first conveyor, means operating in timed relationship to the rate of advance of and moving laterally across said first conveyor for sweeping the material carried thereby in distributed relationship and in a relatively wide layer on said second conveyor, and walls defining said area of said second conveyor to receive said material.

2. A material distributing apparatus comprising a linear conveyor, a shaft supported above the conveyor and extending lengthwise thereof, means supporting a wiping blade from said shaft for sweeping movement across said conveyor, said means carrying a plurality of deflector plates extending at substantially right angles from said wiping blade, and means for rotating the shaft in timed relationship to advancing movement of said conveyor.

3. A material distributing apparatus comprising a linear conveyor, a shaft supported above the conveyor and extending lengthwise thereof, means supporting a wiping blade from said shaft for sweeping movement across said conveyor, said blade lying in substantial parallelism with said shaft, means for rotating said shaft in timed relationship to advancing movement of said conveyor, and a plurality of forwardly extending deflector plates supported from said first-mentioned means.

4. A loose material distributing apparatus comprising a conveyor for a mass of loose material, a shaft supported above the conveyor and extending lengthwise thereof and substantially parallel thereto, means supporting a wiping blade from said shaft for rotation therewith, means for rotating said shaft in timed relationship to advancing movement of the conveyor, a second conveyor, and means for driving said second-mentioned conveyor in timed relationship to the advancing movement of said first-mentioned conveyor and in a direction opposite to the direction of rotation of said wiping blade, said first conveyor crossing said second conveyor at a point intermediate the length thereof to define an area of said second conveyor to the rear of said first conveyor to receive the material in distributed relationship.

5. A loose material distributing apparatus comprising a conveyor for a mass of loose material, a shaft supported above the conveyor and extending lengthwise thereof and substantially parallel thereto, means supporting a wiping blade from said shaft for rotation therewith, means for rotating said shaft in timed relationship to advancing movement of the conveyor, a second conveyor, means for driving said second-mentioned conveyor in timed relationship to the advancing movement of said first-mentioned conveyor and in a direction opposite to the direction of rotation of said wiping blade, said first conveyor crossing said second conveyor at a point intermediate the length thereof to provide a portion of said second conveyor to the rear of said first conveyor to receive the material in distributed relationship, and wall forming members supported above and adjacent to said second-mentioned conveyor and defining said portion.

6. A loose material distributing apparatus comprising a conveyor for said material, wall members supported over said conveyor and defining a space to receive said material, a second conveyor extending at substantially right angles to said first conveyor, a wiping blade constructed and arranged to sweep material from said first-mentioned conveyor in a direction opposed to the direction of movement of said second-mentioned conveyor, said first conveyor crossing said second conveyor at a point intermediate the length thereof to provide an area of said second conveyor to the rear of said first conveyor to receive the material in distributed relationship, and wall members supported above said second-mentioned conveyor and defining said area.

LOUIS A. HAWTHORNE.